(12) United States Patent
Losey

(10) Patent No.: US 6,677,851 B1
(45) Date of Patent: Jan. 13, 2004

(54) REMOTE KEYLESS ENTRY SYSTEM WITH ADVANCED ACTIVATION FEATURES

(75) Inventor: Allan Losey, Ortonville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 513 days.

(21) Appl. No.: 09/638,487

(22) Filed: Aug. 14, 2000

Related U.S. Application Data

(60) Provisional application No. 60/156,047, filed on Sep. 24, 1999.

(51) Int. Cl.[7] .......................... G05B 19/00; G06F 7/00; G08B 29/00; H04B 1/00; H04Q 1/00
(52) U.S. Cl. ..................................... 340/5.62; 340/5.61
(58) Field of Search .............................. 340/5.61, 5.62, 340/5.63, 5.64, 5.65, 5.67

(56) References Cited

U.S. PATENT DOCUMENTS

| | | | | |
|---|---|---|---|---|
| 5,379,033 A | * | 1/1995 | Fujii et al. | 340/825.69 |
| 5,723,911 A | * | 3/1998 | Glehr | 307/10.2 |
| 5,973,611 A | * | 10/1999 | Kulha et al. | 340/825.31 |
| 6,034,617 A | * | 3/2000 | Luebke et al. | 340/825.31 |
| 6,181,254 B1 | * | 1/2001 | Vogele | 340/825.69 |

FOREIGN PATENT DOCUMENTS

EP 0823520 2/1998

* cited by examiner

*Primary Examiner*—Michael Horabik
*Assistant Examiner*—Nam Nguyen

(57) ABSTRACT

Keyless entry systems generate a signal to actuate a security system on a vehicle when keyless entry system is outside of a range of the vehicle. The signal is transmitted to the vehicle once the keyless entry system is within range. In a first embodiment, the signal continues to be sent periodically over a period of time such that the operator can move within range of the vehicle. In a second embodiment, the request signal is stored at the keyless entry system until the keyless entry system receives a signal from the vehicle, which then indicates the keyless entry system is within range of the vehicle. At that time, the signal is sent to the vehicle. This invention facilitates the use of keyless entry systems for a person carrying a number of packages, such that the operator need not actuate the keyless entry system when approaching the vehicle. Further, the system would allow the operator to keep the keyless entry system concealed when approaching the vehicle so as not to provide an indication of which vehicle the operator is approaching.

9 Claims, 2 Drawing Sheets

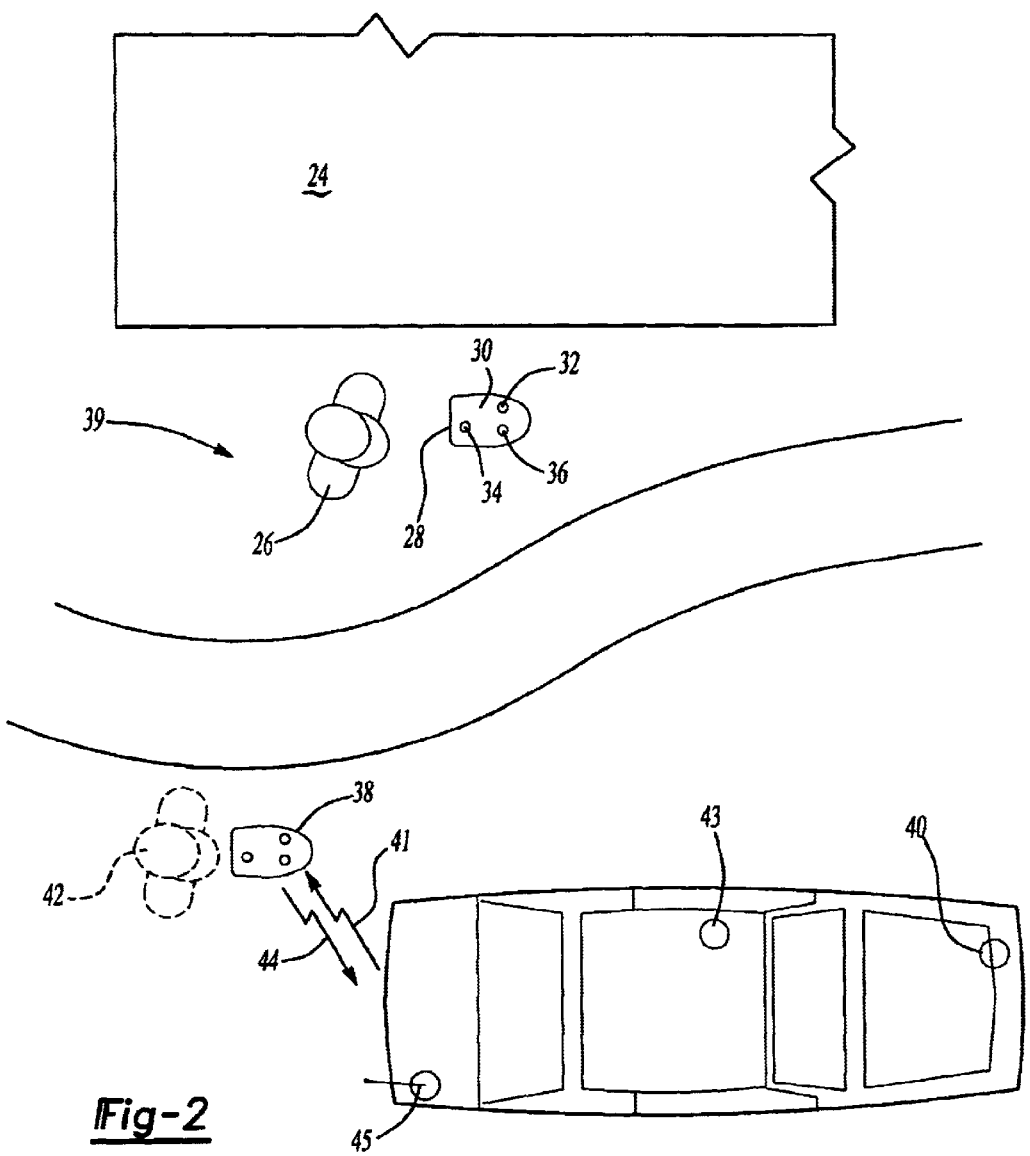
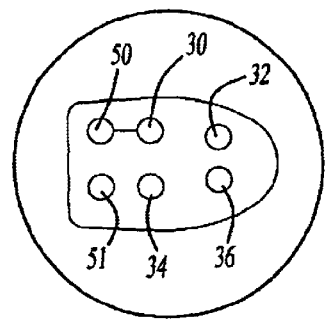
Fig-2
Fig-2A

REMOTE KEYLESS ENTRY SYSTEM WITH ADVANCED ACTIVATION FEATURES

This application claims priority to Provisional Application No. 60/156,047, filed Sep. 24, 1999, and entitled "Remote Vehicle Entry System and Method Employing Advanced Activation Features".

BACKGROUND OF THE INVENTION

This application relates to a remote keyless entry system (RKE) wherein the operator may request an entry signal while remote from the vehicle which will be actuated once the operator reaches a predetermined distance of the vehicle.

Vehicles are typically provided with a number of separate security locking features. As an example, a vehicle is typically provided with a trunk lock, door lock, and may even be provided with an ignition lock that must be released by the operator before the vehicle can be started. Modern vehicles are often provided with a remote keyless entry system. In such systems, an operator can actuate a switch on the keyless entry system, and a signal is sent to a receiver on a vehicle. If the signal matches an expected signal at the vehicle, then the vehicle will actuate the system which has been identified by the signal. As an example, RKEs typically would include trunk unlock and door unlock request switches.

The RKEs do assist the operator of vehicles in gaining quick and easy entrance to a vehicle. However, there may be times when the RKE is still not as helpful as would be desired. As an example, when an operator is walking carrying a number of items, typically the operator must then fumble to actuate an RKE signal, such as door unlock or trunk unlock. Often the operator may need to put the packages down prior to actuating the signal. This is somewhat undesirable.

There may also be times when the operator would like to not be visibly actuating the RKE system. As an example, a criminal could be watching the operator to determine when the operator is approaching his vehicle. In such a circumstance the operator may not wish to actuate the RKE, or even necessarily remove the RKE from a pocket.

SUMMARY OF THE INVENTION

In a disclosed embodiment of this invention, an RKE unlock signal can be actuated remotely of the vehicle, and will actuate a security function as the operator moves within a predetermined distance of the vehicle. In one embodiment, the signal will continue to be sent from the RKE for a period of time after actuation. Thus, the operator may actuate a signal, such as trunk unlock while still in a store. As the operator carries packages towards the vehicle, the signal continues to be periodically sent from the RKE to the vehicle. Once the RKE is within the predetermined actuation distance of the vehicle, the signal will be received by the vehicle, and the lock (i.e., the trunk) will be opened. In preferred embodiments of this invention, the RKE may be provided with both a normal unlock switch and a delay unlock switch. When in the delay mode, most preferably either the door unlock or the trunk unlock signal can be actuated in the above fashion.

In a second embodiment of this invention, the unlock signal is requested by the operator in a fashion similar to the above embodiment. However, the signal is not transmitted over time, but rather is stored within the RKE. The RKE also has a receiver, and the vehicle is equipped to provide a signal. Once the RKE receives the vehicle signal, it can identify that it is within a predetermined range of the vehicle. At that time, the RKE transmits its actuation signal to the vehicle.

In either case, the RKE need not be actuated by the operator when approaching the vehicle. Thus, the operator can continue to carry packages, or may keep the keys in a pocket if desired.

These and other features of the present invention can be best understood from the following specification and drawings, the following of which is a brief description.

BRIEF DESCRIPTION OF THE DRAWINGS

FIG. 2 shows a second embodiment of this invention.

FIG. 2A shows the detail of a remote keyless entry system.

DETAILED DESCRIPTION OF A PREFERRED EMBODIMENT

Figures 1, 1A:
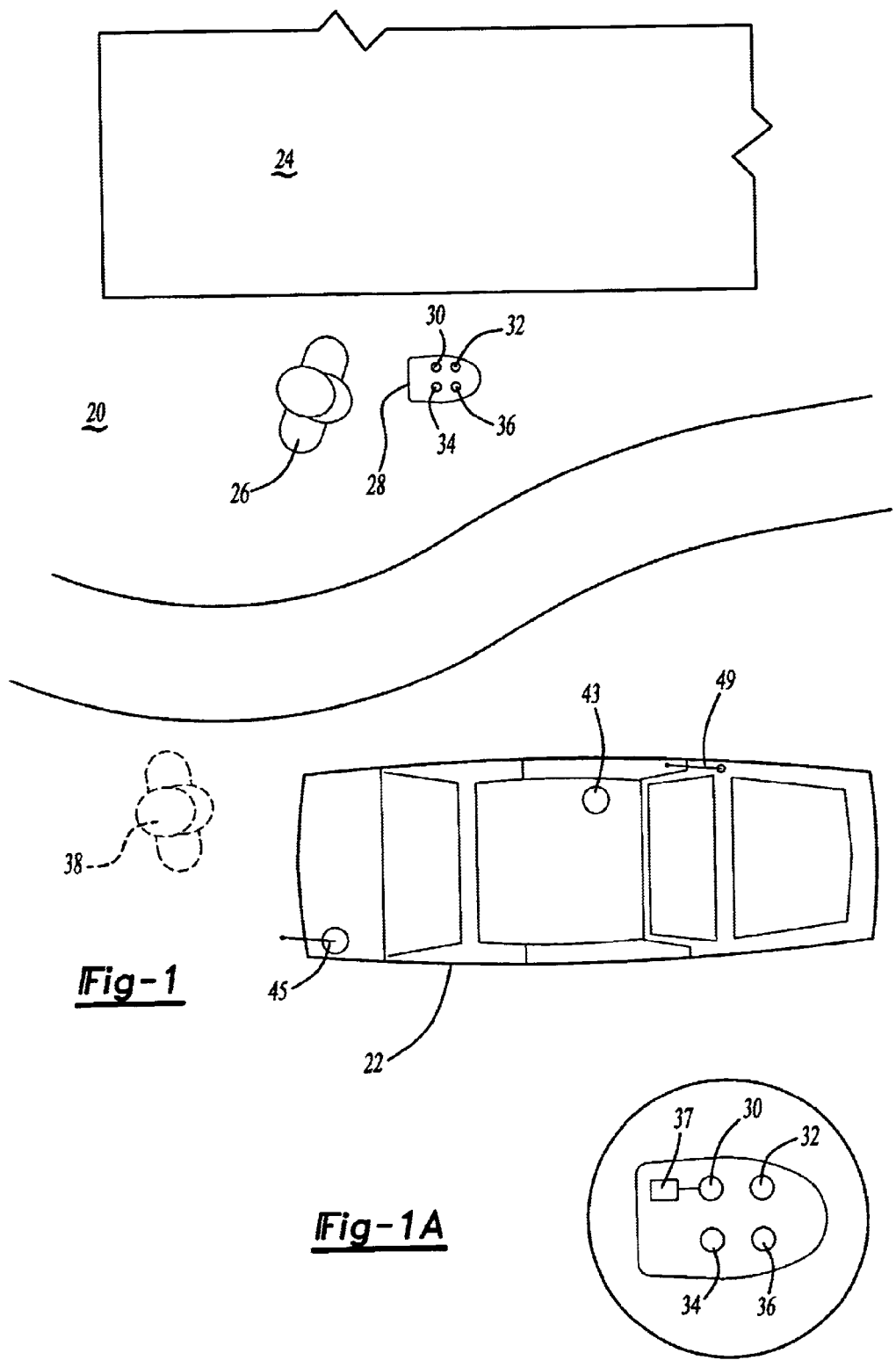
FIG. 1 schematically shows an RKE system incorporating the present invention.
FIG. 1A shows the detail of a remote keyless entry system.

A system 20 is shown in FIG. 1 for actuating security features such as the door lock and trunk on a vehicle 22. As shown, a store 24 has an operator 26 who is the owner of the vehicle 22. As can be seen best in FIG. 1A, the RKE 28 held by the operator 26 includes a time delay signal 30, a door unlock 32, a door lock 34 and a trunk unlock signal 36. While this application only illustrates these two security features, the invention would also apply to power closures, i.e., power deck lid, power hatchback, power lit gate, power sliding door, power tail gate and others.

If the operator wishes to actuate the door unlock or the trunk unlock at the vehicle 22, he may do so prior to leaving the store 22 by simply actuating the switch 30, and then either the switch 32 or 36. Alternatively, the switches 32 and 36 may always have the time extended function. In a normal RKE, a signal is sent at actuation. However, with the present invention, a timer 37 is incorporated to ensure that the signal is sent periodically over a period of time (on the order of at least a minute).

As shown, when the operator is still adjacent to store 24, the signal will not reach the vehicle 22. However, as the operator approaches the vehicle 22, such as shown in phantom at 38, the signal will come within range of the vehicle. At that time, the signal will be received by the vehicle receiver 49, and the door or trunk unlock signal will then actuate a respective security system 43, 45

The keyless entry system in FIG. 2 incorporates both a receiver and transmitter as is known. Further, a memory for storing the request signal for a period of time until the signal 41 is received is also incorporated into the keyless entry system 38. A worker in this art would recognize how to provide such a system.

FIG. 2 shows a second embodiment 39. In embodiment 39, the operator 26 still actuates the RKE 28 when leaving the store 24. However, in this embodiment, a transmitter receiver 40 on the vehicle 22 sends a signal 41 to the RKE 28. As can be seen best in FIG. 2A, the RKE stores its unlock signal in memory 51 from the button 32 or 36 until it receives the signal 41 from the vehicle 22. To this end, RKE 28 has a receiver 50. Thus, while the operator 26 is still adjacent to store 24, the RKE 28 sends no signal to the vehicle. However, as the operator moves towards the vehicle, such as shown in phantom as 42, the signal 41 is received by receiver 50 on RKE 28. At that time, the signal 44 is sent to the vehicle.

Both embodiments are shown schematically. However, the hardware and software are within the skill of a worker in the art. It is the way for accomplishing the functions described above which is inventive here.

In either embodiment of this invention, a signal is received at an RKE which is remote from the vehicle. However, this signal will still actuate the vehicle as the operator approaches within range of the vehicle. Thus, the system could be said to provide the function of allowing actuation of a request for a security system unlock on a vehicle from a position outside a range, and then causing the signal to be received by the vehicle, and the security system actuated as the RKE moves within the range.

Although preferred embodiments of this invention have been disclosed, a worker in this art would recognize that certain modifications would come within the scope of this invention. For that reason the following claims should be studied to determine the true scope and content of this invention.

What is claimed is:

1. A method of actuating a security system on a vehicle comprising the steps of:

1) providing a keyless entry system including a switch for requesting actuation of a security system at a vehicle, said keyless entry system being operable to receive a request signal when outside of a range of a vehicle by actuation of said switch, and cause the signal to be transmitted to the vehicle as the operator moves within range of the vehicle based upon the actuation outside of the range of the vehicle;

2) requesting an actuation system outside of a range of a vehicle by actuation of said switch; and 3) causing actuation of a security system when the operator moves within range of said vehicle, said request being stored at said keyless entry system, and said vehicle sending out a signal, and when said keyless entry system receiving said vehicle signal, it then transmitting its signal back to said vehicle.

2. A method as set forth in claim 1, wherein said security system is a trunk unlock feature.

3. A method as set forth in claim 1, wherein said security system is a door unlock feature.

4. A vehicle security system comprising:

1) a receiver on a vehicle for receiving a signal from a keyless entry signal, said receiver being operable to identify a proper signal and actuate a security function on said vehicle; and 2) a keyless entry system having a switch to request actuation of a vehicle security system, and transmit a signal to said vehicle receiver, said keyless entry system being operable to actuate a request outside of a range of said vehicle by actuation of said switch, and cause transmission of a signal to said vehicle when said keyless entry system moves within said range, said keyless entry system storing said signal until it receives a signal from said vehicle and said keyless entry system then sending a signal back to said vehicle instructing actuation of said security system.

5. A vehicle security system as set forth in claim 4, wherein said security function on said vehicle is a trunk unlock feature.

6. A vehicle security system as set forth in claim 4, wherein said security system on said vehicle is a door unlock feature.

7. A keyless entry system comprising:

a transmitter for transmitting a signal to a receiver on a vehicle requesting actuation of a security system on the vehicle; and a switch to allow a switch input, said keyless entry system being operable to receive said switch input outside of a range of a vehicle, and cause transmission of said signal to the vehicle when said system has moved within said range of the vehicle, said signal being stored at said keyless entry system until said keyless entry system receiving a signal from the vehicle that it has moved within range, said keyless entry system then sending its signal to the vehicle.

8. A keyless entry system as set forth in claim 7, wherein said security system on said vehicle is a trunk unlock feature.

9. A keyless entry system as set forth in claim 7, wherein said security system on said vehicle is a door unlock feature.

* * * * *